K. SUGIMOTO.
TYPE WRITER.
APPLICATION FILED NOV. 7, 1916.

1,245,633.

Patented Nov. 6, 1917.

Inventor
Kyota Sugimoto

K. SUGIMOTO.
TYPE WRITER.
APPLICATION FILED NOV. 7, 1916.
1,245,633.
Patented Nov. 6, 1917.
5 SHEETS—SHEET 2.
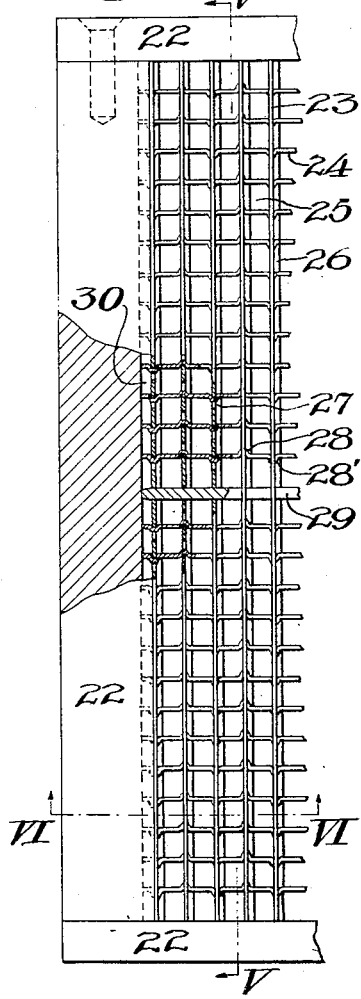
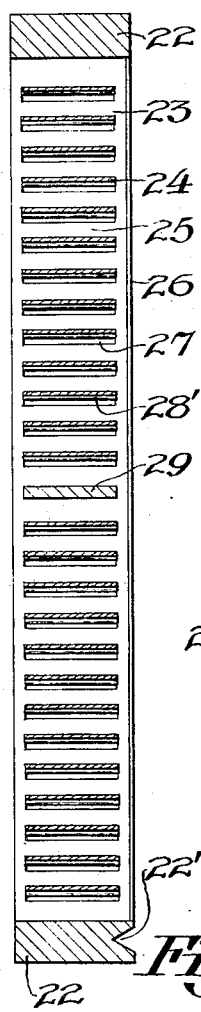
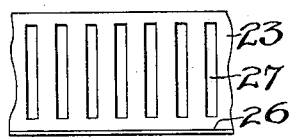
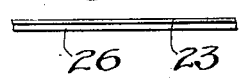
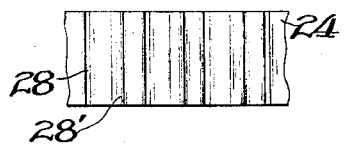
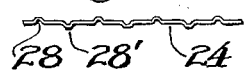
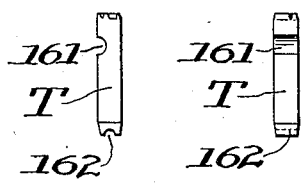
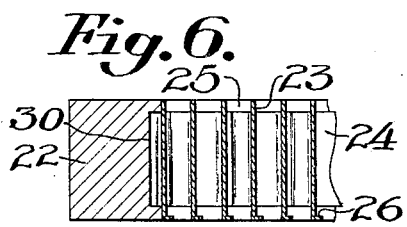
Inventor
Kyota Sugimoto
Attorney

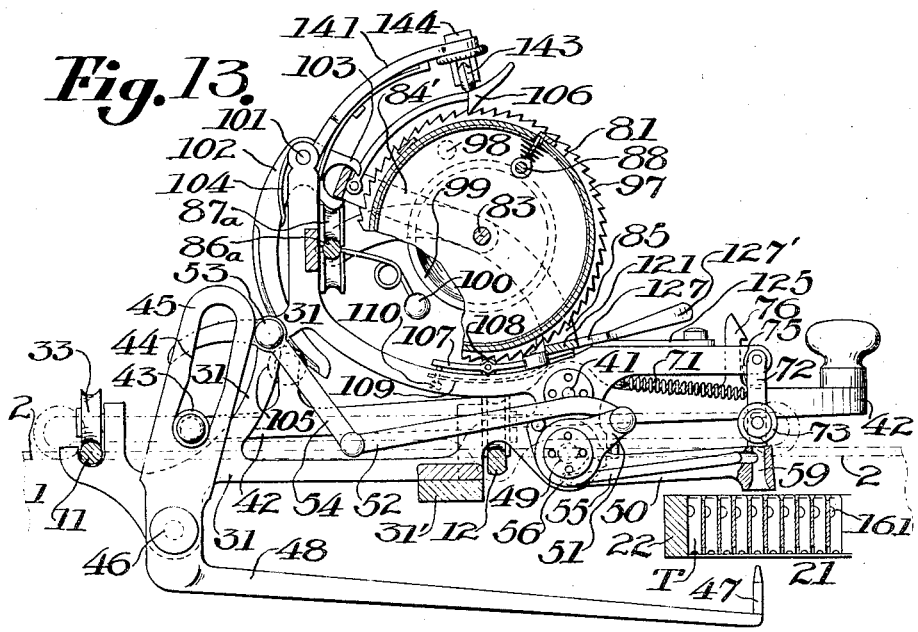
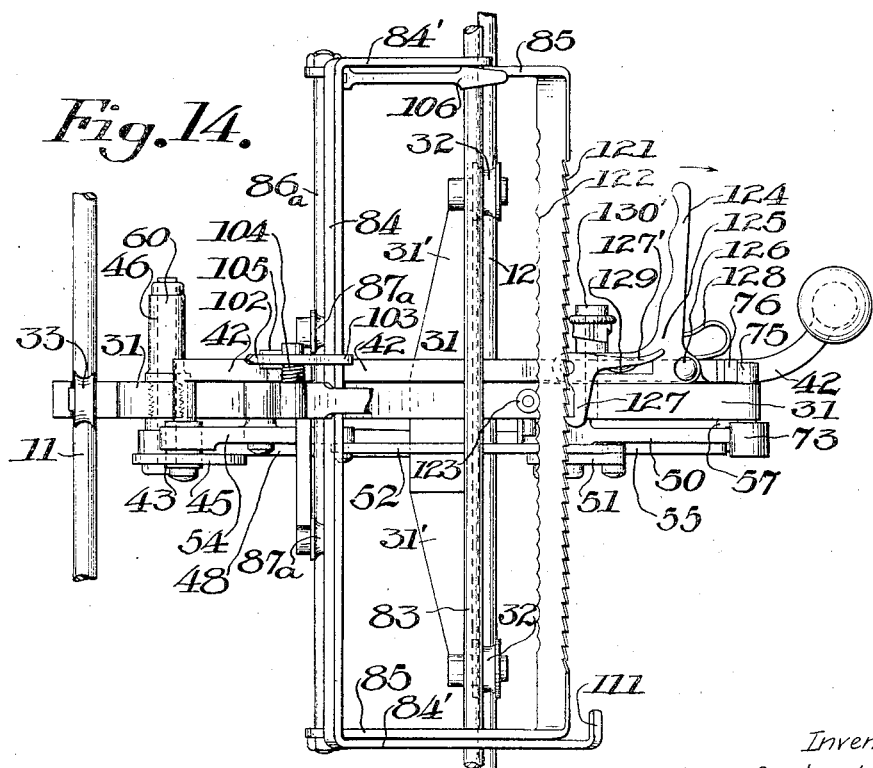

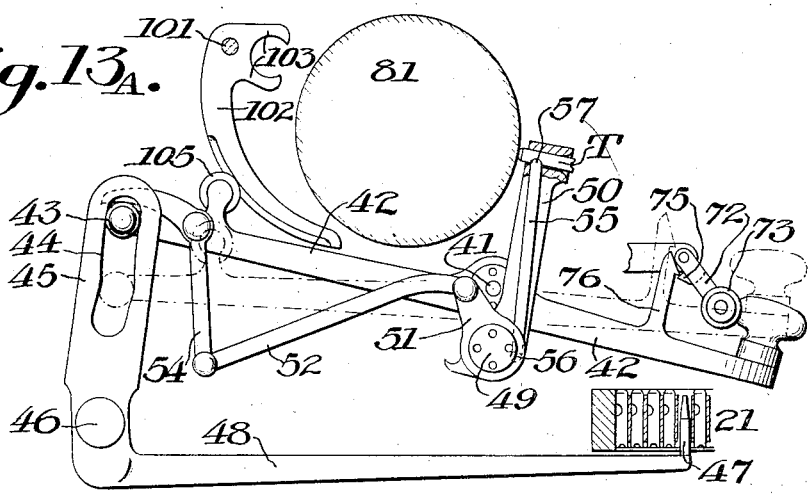
Fig. 13<sub>A</sub>.
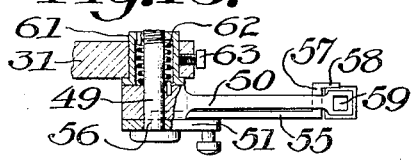
Fig. 15.
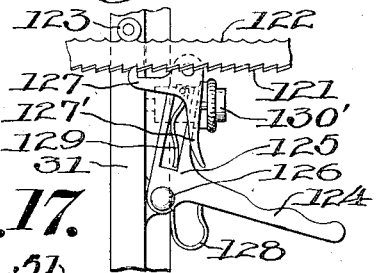
Fig. 20.
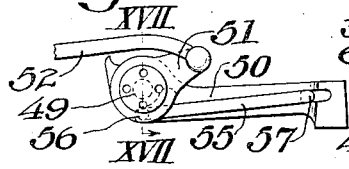
Fig. 16.
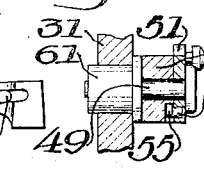
Fig. 17.
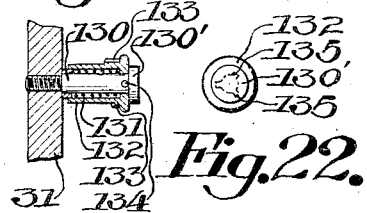
Fig. 21.
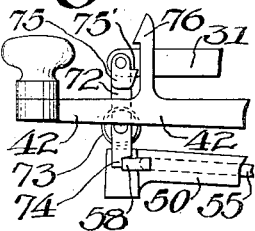
Fig. 18.
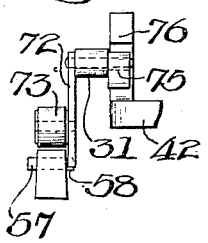
Fig. 19.
Fig. 22.
Inventor
Kyota Sugimoto
Attorney

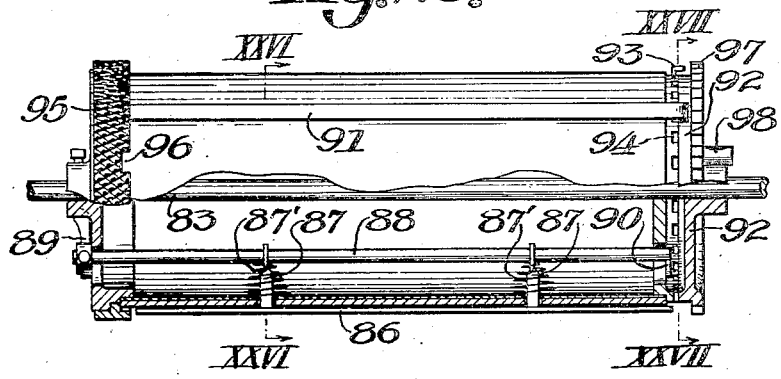
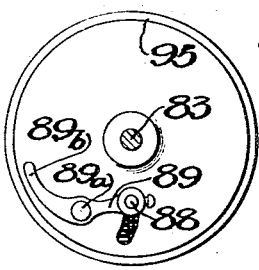
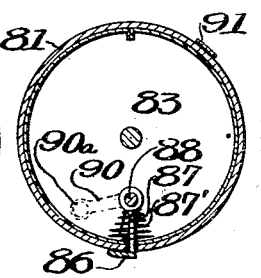
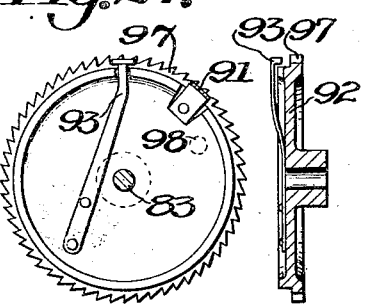
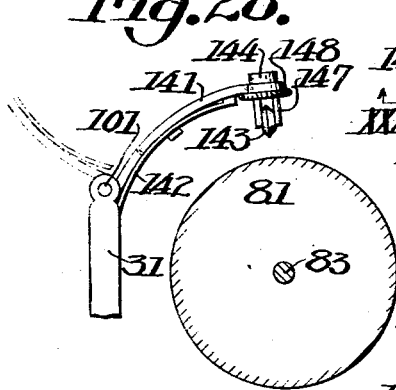
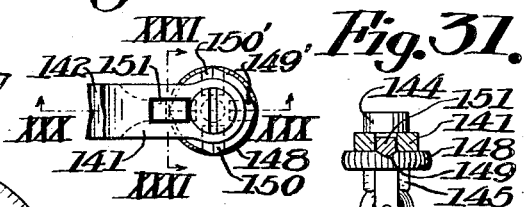
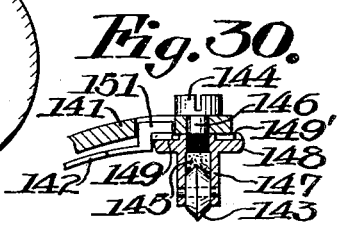
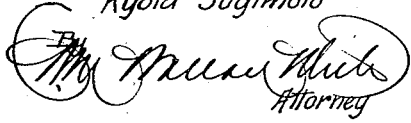

UNITED STATES PATENT OFFICE.

KYOTA SUGIMOTO, OF TOKYO, JAPAN, ASSIGNOR OF ONE-THIRD TO NIHEI OTANI AND ONE-THIRD TO JINNOSUKI SUGIMOTO, BOTH OF KYOTO, JAPAN.

TYPE-WRITER.

1,245,633.  Specification of Letters Patent.  Patented Nov. 6, 1917.

Application filed November 7, 1916. Serial No. 130,010.

*To all whom it may concern:*

Be it known that I, KYOTA SUGIMOTO, subject of Japan, residing at No. 13 Toyooka Cho, Shiba Ku, Tokyo, Japan, have invented new and useful Improvements in Type-Writers, of which the following is a specification.

This invention relates to a typewriter provided with a large number of types and suited principally for typewriting Japanese and Chinese characters, and consists of a type-nest partitioned into a large number of compartments to receive types, of inking and printing devices, which, together with a platen, move over the type-nest right or left, backward or forward, and of spacing, lining and other contrivances.

The chief object of this invention is to effect typewriting easily, quickly and accurately, notwithstanding that a large number of types are used.

The other objects of this invention are to provide a type-nest of strong and easy construction, suited to hold a very large number of printing types arranged in rows in compartments; to provide a printing device which picks up any desired type and impresses it on the paper on the platen; to provide a platen on which paper of any size can be easily and securely fixed; to provide a means for automatically moving the platen one space when a character has been impressed or for moving one space by pushing a knob or handle; to provide a means for obtaining a desired line space; and to provide a means for drawing lines, vertical or horizontal, single or double.

It is to be understood that as this typewriter is designed for the Japanese and Chinese languages, characters are printed in vertical lines, commencing at the rightmost line from the top to the bottom, then the line next to the left from the top to the bottom, and so on.

The accompanying drawings show the typewriter of my invention, in which—

Fig. 4 is a fragmentary plan view of the type-nest, partly in section,

Fig. 5 is a sectional side view of Fig. 4 on the line V—V,

Fig. 6 is a sectional elevation of Fig. 4 on the line VI—VI,

Fig. 7 is a front view of a longitudinal partition of the type-nest, and

Fig. 8 is a plan view of the same.

Fig. 9 is a front view of a lateral partition of the type-nest and

Fig. 10 is a plan view of the same.

Fig. 11 is a side view of a printing type and

Fig. 12 is a front view of the same.

Fig. 13 is a side view of the principal mechanisms.

Figure 1:
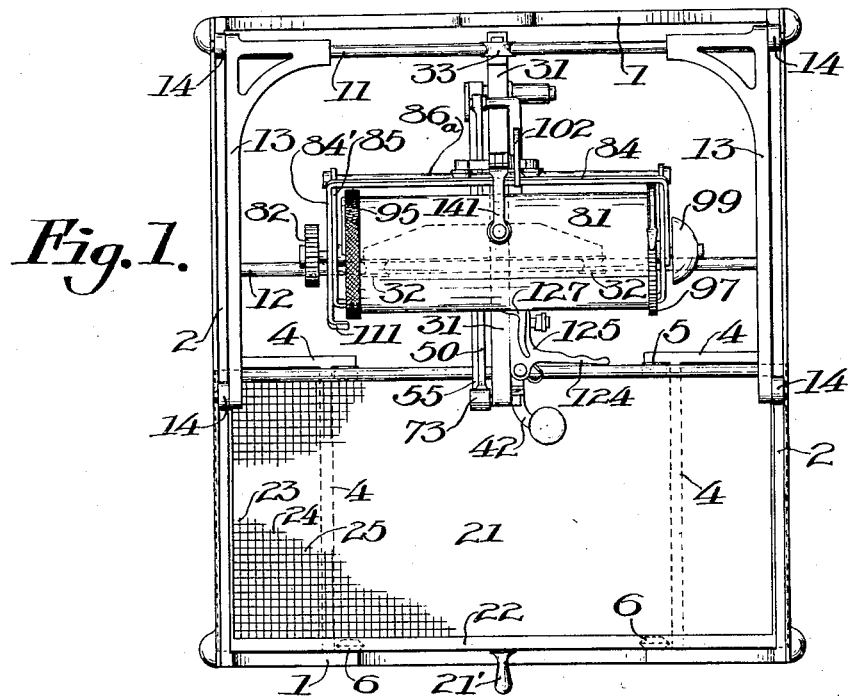
Figure 1 is a plan.

Fig. 13^A is also a side view of the part shown in Fig. 13, showing the position of the inking, printing and spacing devices at the time when the type-bar has taken up a type and struck the paper on the platen.

Fig. 14 is a plan view of the part shown in Fig. 13, without the platen.

Fig. 15 is a plan view of the type-bar, showing the spring mechanism in section.

Fig. 16 is a side view of the same.

Fig. 17 is a sectional view on the line XVII—XVII of Fig. 16.

Fig. 18 is a side view of the inking device seen from the side opposite to that from which it is seen in Fig. 13.

Fig. 19 is a front view of the same.

Fig. 20 is a plan view of the spacing mechanism.

Fig. 21 is a sectional plan view of the stopping means attached to the spacing mechanism and Fig. 22 is an end view of the same.

Fig. 23 is an elevation of the platen, partly in section.

Fig. 24 is a sectional view of the ratchet wheel of the platen.

Fig. 25 is a side view from the left of the part shown in Fig. 23.

Fig. 26 is a sectional view of Fig. 23 on the line XXVI—XXVI.

Fig. 27 is a sectional view of Fig. 23 on the line XXVII—XXVII.

Fig. 28 is a side view of the line drawing device and

Fig. 29, a plan view thereof.

Fig. 30 is a sectional side view of Fig. 29 on the line XXX—XXX.

Fig. 31 is a sectional view of Fig. 29 on the line XXXI—XXXI.

The similar reference numbers represent the same or corresponding parts throughout the figures; and Figs. 13 to 28 are in a larger scale than Figs. 1 to 3, and Figs. 4 to 12 and 29 to 31 are in a still larger scale.

The main part of this typewriter consists of a typewriter frame (1); of a type-nest (21) resting on the frame, types being placed therein with the engraved face upward and arranged according to pronunciation or to the number of strokes, or in any other desirable manner; and of a carriage (31) on which are mounted printing and inking devices, both of which are actuated by a pressing lever (42), a platen (81), a horizontal or line spacing device which moves the platen in the direction of its axis right or left, a vertical spacing device which moves one character space either automatically by the movement of the pressing lever (42) or by pressing a handle (111), and a line drawing device attached to a spring arm (141).

To use this typewriter, first fix the paper on the platen (81). Then taking hold of the pressing-bar (42), move the carriage over the type-nest to such a position that the front end of the type-bar (50) covers a type to be printed, and press down the pressing lever (42). The printing device will take up the desired type and impress it on the paper on the platen. When the pressing lever (42) is released, the type will return to its former place and the platen will automatically revolve one space. When a whole vertical line is written, move the platen with the handle (124) one line space to the right and write next line and so on.

Figure 2:
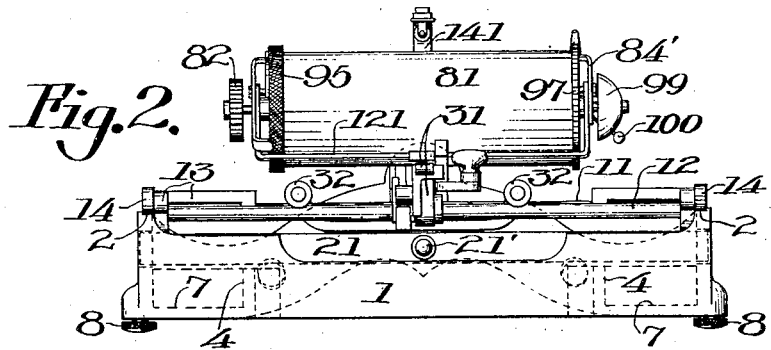
Fig. 2 is a front view.
Figure 3:
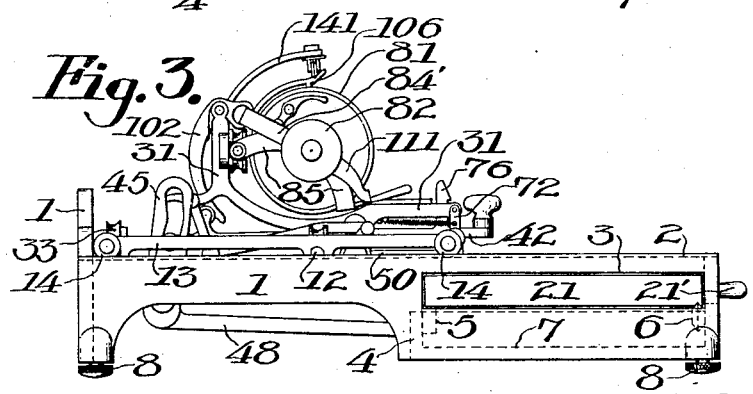
Fig. 3 is a side view.

The typewriter frame (1), as shown in Figs. 1 to 3, is a rectangular frame resting upon four adjustable screw stands (8), the upper parts of two side pieces of which forming parallel rails (2) (2). The front part of the two side pieces has a slit (3) to admit the type-nest. The type-nest is movably supported upon rollers (5) (6) attached to a piece (4) projecting from the side pieces of the frame and to the inner side of the front piece of the frame. The projecting pieces (4) and the front pieces of the frame, together with the bottom (7) form a kind of box on each side of the frame, in which spare types can be kept. The carriage (31) on which are mounted the platen and printing and other devices, moves right and left on two rails (11) (12). These two rails (11) (12) are rigidly fixed at their ends to traveling pieces (13) which by rollers (14) attached thereto, rest upon the parallel rails (2) (2).

The essential points of the type-nest are that it has a large number of compartments and that types contained one in each compartment can be pushed up from below. The one (21) illustrated is an example and consists of frame (22) and of longitudinal partitions (23) and lateral partitions (24) which partitions divide the space inclosed by the frame (22) into a large number of compartments (25). In each of these compartments (25), one printing type is to be placed. Each longitudinal partition (23) is bent at its lower part as shown at (26) (Figs. 7 and 8), in order to prevent the types from falling down through the compartments. It is also provided with slits (27) at regular intervals to receive lateral partitions (24). Each lateral partition (24) is curved out alternately to one side and the other at places where it fits into longitudinal partitions (23), as shown in Figs. 9 and 10. The longitudinal and lateral partitions are fitted together as shown in Figs. 4, 5 and 6, and through the somewhat larger slit at the central part of each longitudinal partition, a somewhat larger lateral partition (29) which has no curves, is inserted. Then the longitudinal partitions will be alternately pushed forward and backward, and one side of each slit (27) will fit into the recess of the curved parts (28) (28') of the partitions (24). The partitions thus constructed are fixed into the frame (22) which is provided with grooves (30) to receive their ends. In each compartment thus formed is placed a printing type with its engraved face upward. Each printing type (T), as shown in Figs. 11 and 12, has a concave part (161) on a side to receive the type-fastening-piece of the type-bar, to be described later. Each type has another concave (162) on its lower end to receive the pyramidal end of a type pushing lever, also to be described later. The curved parts of the lateral partitions project a little into one corner of square compartments (25), but this does not interfere with types being inserted into or pushed out, as compartments are made a little larger than types. The front piece of the type-nest frame (22) is grooved on its under surface as at (22') and rests upon rollers (6) (6), and the back piece of the type-nest frame (22) rests upon rollers (5) (5), all attached to the typewriter frame. Thus the type-nest can be moved right or left with the handle (21'), as may be seen from Figs. 1 to 3. Of course the construction of the longitudinal and lateral partitions can be interchanged, the lateral partitions with slits and longitudinal partitions with curved parts.

The platen and inking, printing and other devices are mounted on the carriage (31). As is seen from Figs. 1, 2, 3, 13, 13$^A$ and 14, the carriage (31) travels right and left on rails (11) (12) by two rollers (32) (32) attached to a lateral member (31') of the carriage rigidly fixed thereto and by a roller (33) attached to the rear part of it. As has already been described, these lateral rails (11) (12) are rigidly fixed to traveling pieces (13) (13) which move on the longitudinal rails (2) (2) by means of rollers (14) attached to the traveling pieces.

Thus the carriage (31) with various devices mounted thereon can move over to any part of the type-nest.

The mechanism for impressing types, as is shown in Figs. 1, 2 and 3, and, in an enlarged scale, in Figs. 13, 13ᴬ and 14, consists of a pressing bar (42) which is pivoted to the carriage (31) at (41); of a type pushing lever (48) which is pivoted to the carriage (31) at (46) and which has its front end, which is pyramidal in form, bent upward; and of a type bar (50) which is pivoted to the carriage (31) at (49). The rear part of the type pushing lever (48) is also bent upward and broadens into blade (45) with a long curved opening (44) at the middle, in which opening a roller (43) at the rear end of the pressing lever (42) moves. The type bar (50) turns on a pin (49). On the same pin (49) turns an arm (51), and the other end of this arm is connected to an end of a bell-crank (54) pivoted to the carriage at (53) by a connecting rod (52). To this arm (51) is pivoted the rear end (56) of a type fastening piece (55). This type fastening piece (55) runs along a side of the type bar (50), and near the front end of the type bar (50), it bends along a groove provided to receive it until it appears on the other side. Then it bends again toward the front along the other side of the type bar for a short distance as shown at (58), Figs. 15 to 18. At the front end, the type bar (50) is provided with a square hole (59) which is enlarged toward the lower part. In Fig. 13, if the knob at the front end of the pressing lever (42) is pressed down, its rear end will rise up. Thus the roller (43) rising along the curved opening (44) of the type pushing lever (48), causes the front end of that lever to rise. When the roller (43) rises to a position shown in Fig. 13ᴬ by a chain line, the type pushing lever will assume the position shown in the same figure by full lines, and the pyramidal projection at the front end thereof will push up the type (T) and insert it in the square hole (59) of the type bar (50). On further pressing down the pressing lever (42), on account of the curved outline of the opening (44) of the type pushing lever (48), that lever will remain at the position it has assumed, but the roller (43) rising further will push up the rear arm of the bell crank (54) which, through the connecting rod (52), will pull the arm (51) backward and make the type fastening piece push forward. The type fastening piece (55) thus pushed forward, its front part (57) will catch the type at the concave part (161) on its side and hold it fast in the square opening at the front end of the type bar (50). The arm (51) being further pulled by the connecting rod (52) and the type fastening piece (55) being further pushed forward, the type bar (50) will be made to revolve upward with (49) as axis, and the type at the front end thereof will strike against the platen, impressing the character on the paper thereon. When the pressing bar is released from the pressure, these parts by their own weight and by springs to be described later will resume their former positions, and the type released from the pressure of the type fastening piece (55) will fall down to its former compartment of the type nest.

Above the square hole at the front end of the type bar (50) there is an ink pad (73) in the form of a roller attached to a hanging rod (72) which is pivoted to the carriage (31) and is pulled backward by a spring (71). The hanging rod (72) has at its lower end a shoulder (74) where it touches the front end (58) of the type fastening piece (55). (See Figs. 18 and 19). Tightly attached to the hanging rod (72) is a small piece (75) with a small projection (75') thereon. There is an erect hook (76) attached to the pressing bar (42) in such a position that it can act upon the projection (75') of the piece (75). When the pressing lever (42) is pressed down and a type is pushed up and inserted in the square hole of the type bar, the type bar cannot move further upward on account of the engagement of the shoulder (74) of the hanging rod (72) with the front end of the type fastening piece (55). But on further pressing the pressing lever, the erect hook (76) of the lever acts upon the projection (75') and causes the hanging rod (72) to swing forward to such a position that the ink pad (73) does not obstruct the type bar going upward; and when the hanging rod swings forward, the ink pad rubs over the engraved face of the type and inks it.

The pivot (46) of the type pushing lever (48), as is shown in Fig. 14, is inserted in a long cylindrical bearing (60) firmly attached to the carriage (31), so that the lever does not jump about. The end of the pivot (49) other than the end on which the type bar (50) turns, is cut into screw thread and a cylinder (61) is screwed on. Within this cylinder and around the pivot there is a coiled spring (62), one end of which is fixed to the cylinder and the other end to the boss of the type bar, which spring causes the type bar to fall down. The cylinder (61) is inserted into a hole of the carriage (31) and fixed by a set screw (63), thus the tension of the type bar spring can be regulated by turning around the cylinder (61).

The platen (81) (see Figs. 1 to 3 and 23) is firmly fixed to a shaft (83) which has a knob (82), and is mounted on the carriage (31) by means of a frame (84) (85) which is mounted on the carriage in such a way that it can move right or left. (See Figs. 13 and 14.) The platen (81) is larger in diameter than that of a common typewriter, so that it can take on it the whole length of the paper. One end of the paper is held fast on the platen by a paper fastener (86) (see Figs. 23 to 27). This paper fastener (86) is connected by means of connecting rods (87) to a rod (88) which is kept pressed toward the center of the platen by means of springs (87'). One end of the rod (88) is firmly fixed to an arm (89) which turns on a pin (89ª) on one end of the platen, and the other end to another arm (90) which turns on another pin (90ª) on the other end of the platen. Thus if the free end (89ᵇ) of the arm (89) is pressed toward the center of the platen, the paper fastener (86) will be separated from the platen. The other end of the paper is held fast to the platen by means of another paper fastener (91). This paper fastener (91) is loosely connected to a ratchet wheel (92), which is made separate from the platen and is loosely borne by the shaft (83) of the platen, the paper fastener (91) being attached in such a way that its free end can be raised from, or dropped down on, the platen. On the inner side of the ratchet wheel (92) is fixed a spring (93) which engages the toothed brim (94) of the platen. When the spring (93) engages the toothed brim (94) of the platen, the ratchet wheel (92) becomes immovable except with the platen, but when it is disengaged, it freely revolves around the shaft (83), so that the paper fastener (91) can be moved to any position according to the size of the paper to be typewritten. The free end of the paper fastener (91) is caught by a ring (95) which freely moves around the other end of the platen. This ring has a notch (96) where the paper fastener (91) can be disengaged from it. On the outer face of the ratchet wheel (92) there is a peg (98) which acts upon a spring hammer (100) which rings a bell (99) (see Fig. 13).

The platen is mounted on a frame consisting of two members (84) and (85). The platen frame member (84) consists of a long bar which runs parallel to the axis of the platen and is bent along the end faces of the platen where it bears the platen shaft (83). On one side the bent part (84') is further elongated forming a handle (111). On a part of this member (84), over the ratchet wheel (92), a pawl (106) is loosely attached which engages the teeth (97) of the ratchet wheel. This member loosely passes between the jaws (103) at the upper end of a curved lever (102). This curved lever (102) is pivoted to the carriage (31) at (101) and is pulled by a spring (104) so that the jaws (103) are always turned downward. When, in typewriting, the pressing lever is pressed down, a roller (105) rises up and pushes away the lower curved arm of the curved lever (102), which raises the jaws (103) at its upper end and the platen frame member (84) which passes through the jaws (103) is raised. The pawl (106) passes over the tooth and falls down into the next notch, and when the pressing lever (42) is released, the platen frame member (84) is pushed down to its original position by the spring (104), and the pawl (106) pulls the ratchet wheel (97) and makes the platen revolve one vertical space. Thus while typewriting vertical space is automatically obtained. In order to prevent jumping about of the platen in moving, there is a roller (108) as shown in Fig. 13, which presses against the teeth of the ratchet wheel (92) from below by a spring (109) provided with an adjusting screw (110). Thus the platen revolves by one tooth of the ratchet wheel and is held fast at its position. To obtain a vertical space without impressing a character, the handle (111) is to be pressed down, which raises the platen frame member (84) and when it is released the pawl (106) will pull the ratchet wheel (97) in the same manner as when the pressing lever (42) is pressed and released. Thus a vertical space is obtained without moving other mechanisms.

The other platen frame member (85) runs parallel to the platen on the front thereof, then bends along both edges of the platen, bears the platen shaft (83) and, extending to the rear thereof, is connected with a traveling rod (86ª). This traveling rod (86ª) is supported by and runs between two pairs of rollers (87ª) pivoted to the carriage (31), two rollers supporting the traveling rod (86ª) from below and the other two from above. The front edge of the front length of the platen frame member (85) is formed as a rack (121). The inner edge of the same part of the member (85) is also serrated (122), but the teeth are of very small height. Into a notch of this serrated face fits a roller (123) pivoted to the carriage (31), the roller preventing the frame member from jumping over and making it move only tooth by tooth when moving right or left. A device for obtaining a line space is mounted on the carriage (31) in front of the rack (121) of the platen frame. (See Figs. 14 and 20). It consists of a bell-crank (125) pivoted to the carriage (31) at (126) and is kept in the position as shown in Fig. 14. One arm of this bell crank forms a handle (124), and to the other arm a pawl (127) is pivoted, the hooked end of which being pressed by means of a spring (129) against and engaging a tooth of the rack (121).

When the handle (124) is pulled in the direction shown by an arrow in Fig. 14, the bell-crank revolves with the pivot (126) as the axis. Thus the pawl (127) will be pulled to the right and the hooked end of the pawl which engages the tooth of the rack (121), will pull the platen to the right, and thus a line space is obtained. When the handle (124) is released, the bell crank (125), and also the pawl (127), will return to their former position by means of spring (128), and as this time the hooked end of the pawl passes over the teeth of the rack, the platen will not be moved. In order to regulate the motion of the bell crank (125), so as to obtain any desired lateral space, there is attached to the carriage (31) a device to stop the motion of the bell crank (see Figs. 14, 20, 21 and 22). It consists of a peg (130) with a head (130') rigidly fixed to the carriage (31). On the peg (130) is fitted a cylinder (132) which is kept pressed against the head (130') of the peg (130) by a coiled spring (131). The edge of the enlarged part (133) of this cylinder is cut obliquely in a zigzag way forming shoulders of different lengths to stop the motion of the bell crank (125). The opening at the top of the cylinder (132) is provided with notches (135) to engage a small projection on the inner side of the head (130') of the peg (130). When the cylinder (132) is pressed, it will be disengaged from the small projection (134) on the inner side of the head (130') of the peg (130), and the cylinder (132) can be revolved around the peg. When you have found the right shoulder to stop the motion of the bell crank (125) and released the cylinder, it will be pressed against the head (130') of the peg and engage the projection on the inner side thereof. To release the spacing device, push the handle (127') of the pawl (127) to the right (Fig. 20), then the hooked end thereof will be disengaged from the tooth of the rack (121), and the platen can be freely moved right or left.

On the rear of the platen (81), there is an arm (141) pivoted to the carriage (31) at (101), and held in position as shown in the Figs. 13 and 28 by a spring (142) attached to the under surface of the arm (141). At the free end of the arm (141) is pivoted a line drawing roller bracket (147) by a screw (146) as shown in Figs. 29 and 30 in such a way that the bracket can be revolved. In the bracket is pivoted a line drawing roller (143) having sharp circumference, and above this roller an ink pad (145). At the top of this line drawing roller bracket (147) is attached a knob (148) with which the bracket can be revolved. On the top face of this knob there are V-shaped grooves (149) (149') (150) (150') at right angles with one another. The front part of the spring (142) is bent upward, enters a groove provided near the end of the arm (141), and ends with a V-shaped termination (151) which engages one of V-shaped grooves (149) (149') (150) (150') and thus keeps the line drawing roller (143) in a position either parallel to, or at right angle with, the axis of the platen according as the V-shaped termination engages with (149) (149') or with (150) (150').

When the line drawing device is in the position as shown in the figure, if the roller is pressed against the paper and the platen moved in direction of its axis, then a lateral line will be drawn. If the bracket is turned ninety degrees and the roller is pressed against the paper and the platen revolved, then a longitudinal line will be drawn. When it is not required to draw a line the device is to be kept in the position shown in Fig. 26 by chain lines. The roller should be fixed in such a way that its sharp circumference is a little to right or left of the center, for if after drawing a line the roller bracket is revolved 180 degrees and another line be drawn, then we shall obtain a double line.

The typewriter as hereinbefore described may be used as follows:—First fix the paper on the platen (81), and then with the pressing lever (42) move the carriage (31) to such a position that the square hole (59) at the front end of the type bar covers a type in the type nest (21) which is to be printed. Press the pressing lever, then the type will be pushed up, held fast by the type bar, inked and hammered against the platen. When the pressing bar is released, the type will return to its former position in the type nest, and the platen will be revolved one character space. To turn the platen one character space without impressing any character, the handle (111) is to be pressed. When a whole line has been written, the platen is to be moved one line space by pulling the handle (124). The greater part of types in the type nest can be used without moving the type nest, but when to use types lying on the right or left side of the nest, move the type nest to the left or right with the handle (21'), and proceed as described above. To use spare types, replace types in the nest with the desired spare types, and impress them.

Thus, in this typewriter a large number of types can be kept in the type nest and any one of them can be picked up and impressed. This typewriter is therefore adapted to be used with the Japanese or Chinese or any other language in which a large number of characters are used. The size of the machine is comparatively small. According to experience a machine with a frame of 1 foot 6 inches by 1 foot 8 inches can keep about 2,300 types in the type nest and about 800 spare types in the spare type boxes.

Having thus described my invention, what I claim and desire to secure by Letters Patent is:—

1. A typewriter having a type-nest which is partitioned into a multiplicity of compartments; a plurality of types, one in each compartment; a type-printing mechanism movable over the type-nest relative to any selected type and then operable to seize said type and lift said type completely out of its compartment and transport the same to a predetermined printing point, and a movable platen operating with the type-printing mechanism to position a predetermined part of the platen so that the said part will be impacted by the selected type when thus transported, substantially as described.

2. A typewriter having a type-nest which is partitioned into a multiplicity of compartments; a plurality of types, one in each compartment; a type-printing mechanism movable over the type-nest relative to any selected type and then operable to engage said type and transport the same to a predetermined printing point, a platen movable with the type printing mechanism so as to be always positioned to present a part thereof to be impacted by the selected type at said printing-point, and an inking device movable with the type-printing mechanism so as to be always positioned to ink the selected type before the type impacts the platen; substantially as described.

3. In a typewriter, the combination of a typewriter frame; a type-nest mounted on the frame; a plurality of separately movable types in the type-nest; guide rails on the frame extending from right to left thereof; a traveling frame supported on and movable lengthwise of the guide rails; guide rails fixed on the traveling frame and extending from front to rear; a carriage supported on and movable lengthwise of the last-mentioned guide rails; a platen on the carriage; and printing and inking mechanism on the carriage including means operable to remove a type from the type-nest and move the type into printing impact with the platen; substantially as described.

4. In a typewriter, the combination of a typewriter frame; a type-nest mounted on the frame; a plurality of separately movable types in the type-nest; guide rails on the frame; a traveling frame supported on and movable lengthwise of the guide rails; guide rails fixed on the traveling frame at right angles to the first-mentioned guide rails; a carriage supported on and movable lengthwise of the guide rails on the traveling frame; a platen on the carriage; printing mechanism on the carriage operable to remove a selected type from the type-nest and move the same into printing impact with the platen, and spacing mechanism for moving the platen relative to the carriage when a type is moved into printing impact with the platen; substantially as described.

5. In a typewriter, the combination of a type-nest; a plurality of separately bodily removable types in the type-nest; a carriage movable relative to the type-nest; and printing mechanism on the carriage including a type-selecting lever for removing a selected type from the type-nest, a pivoted type bar shaped and arranged to receive said removed type, a fastening piece movable on the type bar for securing said type to the type bar, and a finger or pressing lever operatively connected to the type-selecting lever, the type bar and fastening piece, whereby when the pressing lever is actuated a selected type is removed from the type-nest and secured to the type-bar and transported by the latter toward a predetermined printing-point; substantially as described.

6. In a typewriter, the combination of a type nest, a movable carriage; and printing mechanism including a type-pushing lever pivoted on the carriage and provided at one end with an opening and at its other end with a projection for pushing up a type from the type-nest, a finger or pressing lever pivoted on the carriage, a type bar pivoted on the carriage and positioned to have advanced thereagainst a type pushed up from the type-nest, a bell crank pivoted on the carriage, a roller on the rear end of the pressing lever working in the opening in the type-pushing lever and engaging the bell crank to move the same on its pivot when the pressing lever is operated, a fastening piece for clamping the selected type against the type bar, and operative connections between the bell crank and the type bar and the fastening piece whereby a single operation of the pressing lever removes a type from the type-nest and clamps the type on the type bar and actuates the type-bar to advance said type toward a predetermined printing point; substantially as described.

7. In a typewriter, the combination of a type nest, a movable carriage; and printing mechanism including a type-pushing lever pivoted on the carriage and provided at one end with an opening and at its other end with a projection for pushing up a type from the type-nest, a pressing lever pivoted on the carriage, a roller on the rear end of the pressing lever working in the opening in the type-pushing lever, a type bar pivoted on the carriage adapted to have advanced thereagainst a type pushed up by the type-pushing lever, an arm pivoted on the carriage, a type-fastening piece pivoted on the arm, the type bar having a groove and the front end of the fastening-piece carrying a type engaging bend and the fastening-piece engaging said groove and being slidable along the type bar, a bell crank pivoted on the carriage and actuated by the roller on the pressing lever, and an operative connection between the bell crank and the arm; substantially as described.

8. In a typewriter, in combination with the carriage, an inking device comprising a depending rod pivoted on the carriage; an ink pad in the form of a roller attached to the depending rod; a pivoted finger or pressing lever; and co-acting parts carried by the rod and lever so shaped and arranged that when the lever is operated one of said parts acts as a cam to move the rod on its pivot; substantially as described.

9. In a typewriter, in combination with the carriage, an inking device comprising a depending rod pivoted on the carriage; an ink pad in the form of a roller attached to the depending rod; the rod being formed with a projection; a finger or pressing lever; and an erect hook formed on the lever for co-action with the projection on the rod whereby when the lever is operated the rod is moved on its pivot; substantially as described.

10. In a typewriter, the combination of a type-nest, a carriage, a pressing bar, a roller at the rear end of the pressing bar, a type-pushing lever pivoted on the carriage and having at its rear part an opening in which the roller at the rear end of the pressing bar acts, the pressing bar having at its front end a projection for pushing up a type from the type-nest when the type-pushing bar is actuated, a type bar pivoted on the carriage, an arm pivoted on the carriage, a type-fastening piece pivoted on the arm, the type bar having a groove and the type-fastening piece having bends near its front end and there entering the groove of the type bar to guide the fastening-piece for backward and forward movements along the type bar, the type-fastening piece being so pivoted on the arm that when the arm is moved on its pivot the type-fastening piece moves along the arm, a hanging rod having at its lower end a shoulder adapted to be engaged by the front end of the type-fastening piece, the hanging rod having a projection near its upper end, an erect hook on the pressing bar adapted to engage with the projection on the hanging rod to move the rod when the pressing bar is operated, and an inking roller pivoted on the hanging rod; substantially as described.

11. In a typewriter, a type-nest having longitudinal and lateral partitions forming a plurality of compartments, one set of partitions being provided with a number of slits and the other set with a number of curved parts alternately projecting on opposite sides of the partition, the curved parts of one set interlocking with the slits of the other set, and a frame in which the partitions are fixed when interlocked; substantially as described.

In testimony whereof I have signed my name to this specification in the presence of two subscribing witnesses.

KYOTA SUGIMOTO.

Witnesses:
 KORAKU OKADA,
 H. F. HAWLEY.